(12) United States Patent
Feller et al.

(10) Patent No.: US 11,291,973 B2
(45) Date of Patent: Apr. 5, 2022

(54) REACTOR AND METHOD FOR CONTINUOUS POLYMERIZATION

(71) Applicant: ARLANXEO DEUTSCHLAND GMBH, Dormagen (DE)

(72) Inventors: Rolf Feller, Solingen (DE); Hanns-Ingolf Paul, Leverkusen (DE); Paul Wagner, Düsseldorf (DE); Udo Wiesner, Bornheim (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 0 days.

(21) Appl. No.: 16/629,611

(22) PCT Filed: Jul. 6, 2018

(86) PCT No.: PCT/EP2018/068387
§ 371 (c)(1),
(2) Date: Jan. 9, 2020

(87) PCT Pub. No.: WO2019/011811
PCT Pub. Date: Jan. 17, 2019

(65) Prior Publication Data
US 2021/0008519 A1    Jan. 14, 2021

(30) Foreign Application Priority Data

Jul. 12, 2017 (EP) .................... 17180921

(51) Int. Cl.
*B01J 19/00* (2006.01)
*B01J 19/18* (2006.01)
*B01J 19/20* (2006.01)

(52) U.S. Cl.
CPC ........... *B01J 19/1812* (2013.01); *B01J 19/20* (2013.01); *B01J 2219/00085* (2013.01); *B01J 2219/185* (2013.01)

(58) Field of Classification Search
CPC ........ B01J 19/00; B01J 19/18; B01J 19/1812; B01J 19/20; B01J 2219/00;
(Continued)

(56) References Cited

U.S. PATENT DOCUMENTS 3,354,136 A    11/1967    Crawford
3,440,019 A    4/1969    Albrecht et al.
(Continued)

FOREIGN PATENT DOCUMENTS

CN    201848215 U    6/2011
CN    204320308 U    5/2015
(Continued)

OTHER PUBLICATIONS

International Search Report and Written Opinion, PCT Application No. PCT/EP2018/068387 dated Oct. 1, 2018.
(Continued)

*Primary Examiner* — Natasha E Young
(74) *Attorney, Agent, or Firm* — The Dobrusin Law Firm, P.C.

(57) ABSTRACT

The invention relates to a reactor and to a method for continuous polymerization, in which said reactor for the continuous production of polymers, particularly synthetic rubbers, contains at least one substantially tubular reactor housing (4), wherein said reactor housing (4) has a drive shaft (30) that is connected to at least one agitator (38) arranged such that it can rotate inside the reactor housing (4), and the agitator contains at least one, and preferably two, three or four helical mixing elements (24) which are designed to be preferably close to the wall or to come into contact with the wall.

29 Claims, 6 Drawing Sheets

Figure 1:
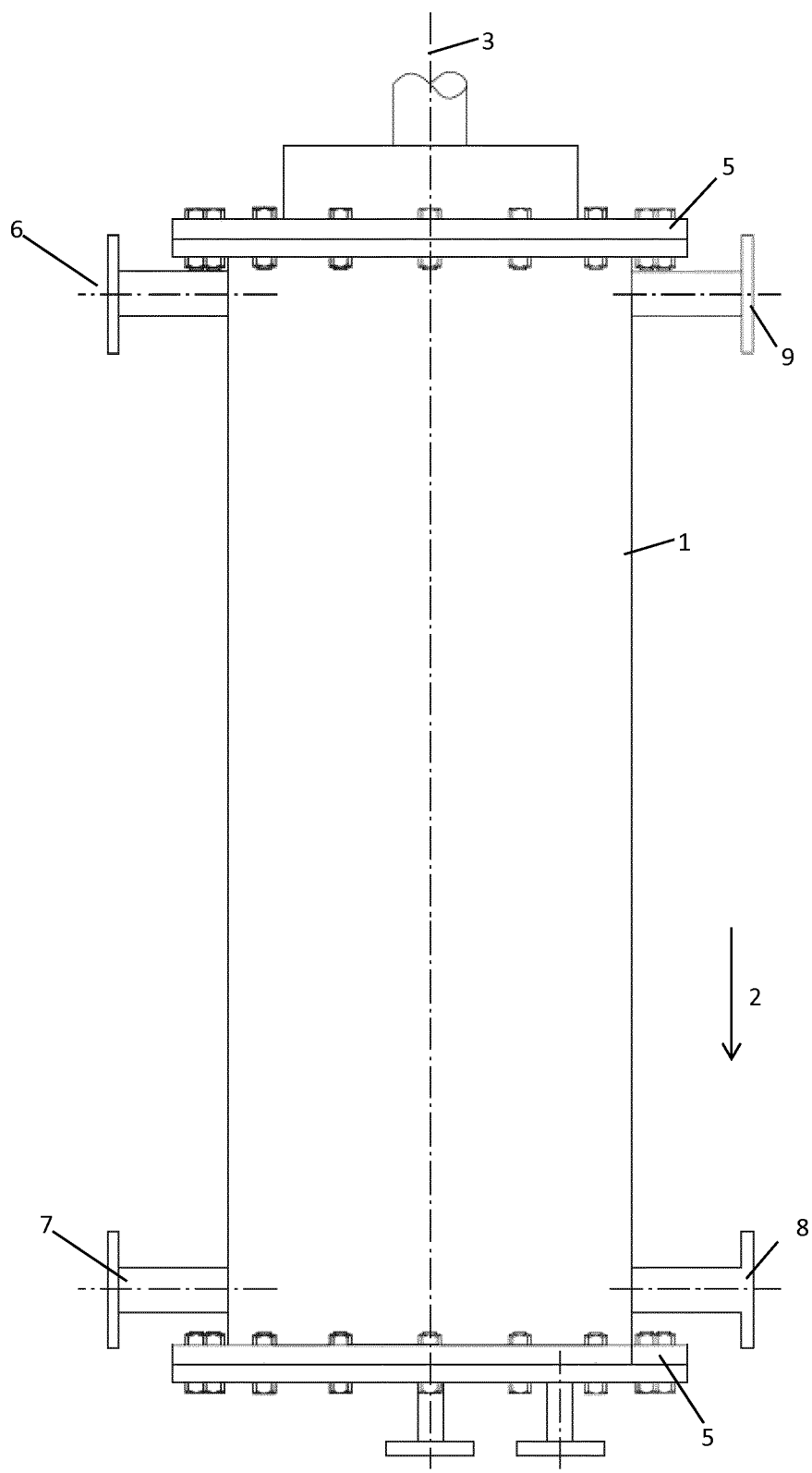

(58) Field of Classification Search
CPC .... B01J 2219/00049; B01J 2219/00051; B01J 2219/00074; B01J 2219/00076; B01J 2219/00085; B01J 2219/18; B01J 2219/185
See application file for complete search history.

(56) References Cited

U.S. PATENT DOCUMENTS

| | | | |
|---|---|---|---|
| 3,476,522 A | | 11/1969 | Stovall |
| 3,495,951 A | | 2/1970 | Tanaka et al. |
| 4,277,585 A | | 7/1981 | Fournel et al. |
| 4,282,925 A | | 8/1981 | Hay et al. |
| 4,383,093 A | | 5/1983 | Shiraki et al. |
| 5,674,956 A | * | 10/1997 | Nakamoto .......... B01F 7/00175 526/88 |

FOREIGN PATENT DOCUMENTS

| | | |
|---|---|---|
| CN | 205182733 U | 4/2016 |
| EP | 0074570 A2 | 3/1983 |
| EP | 2135890 A2 | 12/2009 |
| EP | 2269727 A1 | 1/2011 |
| EP | 2465604 A1 | 6/2012 |
| GB | 1280360 A | 7/1972 |
| WO | 2011/009698 A1 | 1/2011 |

OTHER PUBLICATIONS

International Preliminary Report on Patentability, PCT Application No. PCT/EP2018/068387 dated Jan. 14, 2020.
Chinese Office Action, Application No. CN 201880056688.1 dated Jun. 8, 2021.

\* cited by examiner

REACTOR AND METHOD FOR CONTINUOUS POLYMERIZATION

This application is a national stage application claiming priority to PCT/EP2018/068387, now WO 2019/011811, filed on Jul. 6, 2018, which claims priority to European Patent Application serial No. EP17180921.3, filed on Jul. 12, 2017.

FIELD

The present invention relates to a reactor, in particular a tubular reactor, its use in a process for the continuous production of polymers, in particular synthetic rubbers, and the aforementioned process itself.

BACKGROUND

From U.S. Pat. No. 4,282,925 a heat exchanger is known which has an essentially tubular housing with a vertically running central shaft. The heat exchanger has a scraper that runs along the inside of the housing with the aid of scraper blades.

A disadvantage of such a heat exchanger is that it does not allow axial mixing and thus, in the case of a strongly exothermic reaction, the heat is generated very locally at the inlet of the tubular reactor. This leads to a sharp increase in temperature at this point, since the heat can only be inadequately removed due to the small cooling area in the area of the reaction zone. Overall, the reaction conditions are difficult to control and it is hardly possible to set a desired molecular weight distribution.

A continuous polymerization reactor is known from U.S. Pat. No. 3,354,136, which has a tubular housing with a vertically running rotating central helix. The device also contains several concentrically arranged cooling surfaces, which are cleaned using rotating scrapers. Via the central helix, axial axial conveyance is created, so that loop flow occurs in the device via the central tube and the annular gaps between the cooling surfaces, which ensures homogeneous mixing of the device. By cleaning the cooling surfaces, they are kept free, so that a constantly high heat dissipation is made possible.

A disadvantage of this apparatus, however, is the relatively high proportion of polymerization solution in the central tube. In the case of a rapid and highly exothermic polymerization reaction, this can lead to temperature gradients in the central tube and thus to undesirably broad molecular weight distributions.

The arrangement of several annular gaps to increase the heat transfer area makes cleaning the apparatus more difficult in the event that the resulting insoluble components accumulate during the reaction on the rotating parts inside the reactor and can therefore at least partially clog the annular gaps. This leads to an uneven distribution of the loop flow in the apparatus and complicates or prevents complete cleaning/rinsing of the apparatus with a chemical rinsing solution, which destroys the insoluble components and discharges them from the reactor.

From U.S. Pat. No. 3,495,951 a screw reactor is known which has a tubular housing with a cooling jacket. In the center of the housing there is an inner tube, which can also be cooled using a cooling medium. In the annular gap between the central tube and the outer wall, a screw-shaped rotating conveying element is introduced, which promotes the reaction solution from the inlet opening at the upper end of the apparatus to the outlet opening at the underside of the apparatus. This conveyor element avoids a laminar flow profile and, even at low flow speeds and small Reynolds numbers, uniform flow through the apparatus with sufficient radial mixing is achieved, which enables good heat transport in the reaction solution and thus enables uniform temperature control in the radial direction.

The disadvantage of this apparatus for a strongly exothermic continuous polymerization reaction is the lack of axial mixing and the formation of a plug flow. This prevents a wide reaction zone with the largest possible area for heat dissipation and results in an uneven temperature distribution in the reactor, which promotes an undesirably wide molecular face distribution.

From U.S. Pat. No. 4,383,093 a tubular reactor with a rotating spiral as a conveying element is known. This spiral has only a weak mixing effect in the axial direction. By cooling only through the outer wall of the reactor, the cooling surface on an industrially relevant scale is small and the poorly mixed holdup inside the reactor is large in relation to the cooling surface. Thus, radial temperature gradients can result in exothermic liquid phase polymerization, which lead to an undesirably broad molecular weight distribution.

SUMMARY

It is the object of the invention to provide a reactor and a process for continuous polymerization, by means of which the reaction conditions of the polymerization can be better influenced and in particular the setting of a desired (narrow) molecular weight distribution can be facilitated.

According to the invention, the object is achieved by a reactor having the features of claim 1 and a process having the features of claim 29. Preferred embodiments of the invention are specified in the subclaims.

The reactor for continuous polymerization according to the invention, which can be used in particular for the production of synthetic rubbers by polymerization, comprises at least one essentially tubular reactor housing. The starting materials for the polymerization, as well as additives, solvents and activator for starting the polymerization, can be fed in via one or more inlet ports at the upper end of the reactor. In addition, other additives, initiators or monomers can be supplied via any further inlet connections which are distributed over the reactor height. In one embodiment of the invention, the polymerization solution at the lower end of the reactor is discharged through one or more nozzles.

In a further embodiment, the reactor can also be operated with an inlet nozzle at the lower end and an outlet nozzle at the upper end or in a lying position.

A displacement body is installed inside the reactor housing and is arranged essentially along the geometric central axis.

Both the displacement body and the outer wall of the reactor housing can be cooled or heated using a cooling or heating medium. For this purpose, one or more cooling elements, such as cooling or heating mantles, half-pipe coils or heating or cooling coils, are applied to the reactor housing. The displacement body is preferably also provided with one or more cooling elements such as a jacket or corresponding channels for temperature control. The heating or cooling can take place both on the outside and on the inside either via liquid heating or cooling media or by means of boiling or condensing media. In the case of boiling cooling media, an arrangement as a vertical reactor with a drive located at the bottom and a displacement body let into the reactor from above is preferred, since the vapors of the cooling medium can then leave the displacement body upwards.

Possible coolants here are ethylene, ethane, propylene, propane, isobutane, ammonia, etc., as well as commercially available heat transfer fluids, which are well known to the person skilled in the art, both for single-phase and for multi-phase use.

Figure 2:
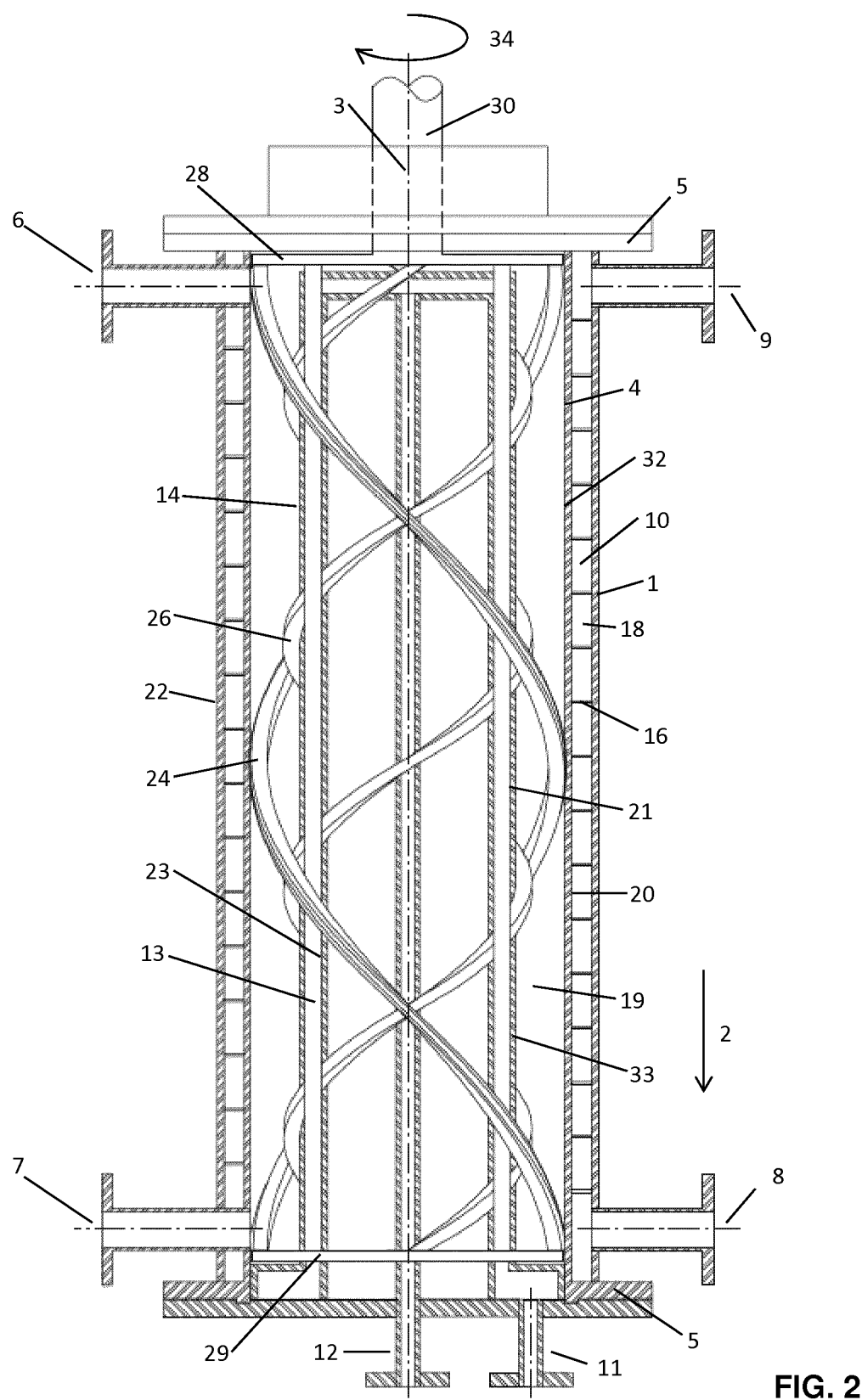
Figure 8:
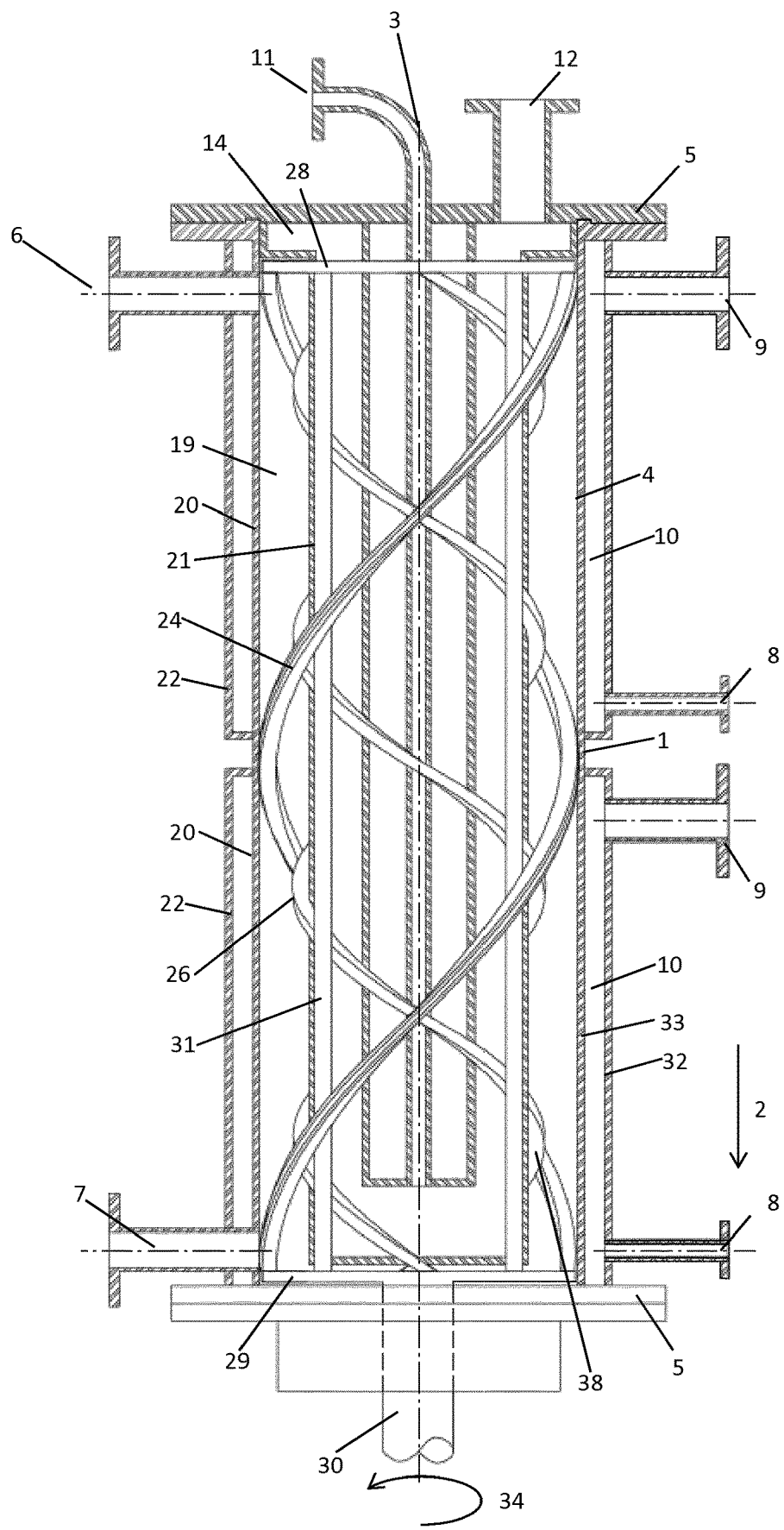

The reaction space is the annular gap remaining over the reactor height between the reactor housing and displacement body. The displacement body preferably extends that height of the reactor, such as illustrated in FIGS. 2 and 8.

The reactor has a drive which is connected to at least one helical mixing element which is rotatably arranged within the annular gap. Two or more helical mixing elements are preferably rotated via a drive, the mixing elements being connected to the drive via a central shaft and a circular disk attached to this shaft and together forming the stirrer. The helical mixing elements are arranged, for example, so that one, preferably two or more mixing elements run close to the wall or with wall contact on the outer reactor wall and one, preferably two or more mixing elements run close to the wall or with wall contact on the inner wall of the displacement body.

Preferably, at least two, three or four helical mixing elements are preferably arranged one behind the other in the circumferential direction, preferably at an equal distance from one another. With two mixing elements there is an angle $\alpha=180°\pm5°$ in the circumferential direction, with three mixing elements an angle $\alpha=120°\pm5°$, with four mixing elements an angle $\alpha=90°\pm5°$ and so on. This leads to an additional centering.

The conveying direction in the axial direction of the inner and outer helical mixing elements can be the same or opposite, with an opposite conveying direction being preferred since this produces what is known as a loop flow and thus a particularly good mixing of the apparatus in the axial direction is achieved. Due to the complex flow form between the helical mixing elements on the reactor housing and on the surface of the cylindrical displacement body, especially when the conveying direction is opposite, effective radial mixing is also achieved. In one embodiment, this radial mixing can additionally be supported by attaching appropriately oriented guide plates to the support structure of the helical mixing elements or by appropriate shaping of the support elements themselves.

At the end of the stirrer, which is not connected to the drive, the mixing elements are preferably firmly connected to an annular disk, which runs, for example, via corresponding slide bearings on the inside of the reactor housing or on the outside of the cylindrical displacement body, and thus a radial bearing for can form the stirrer.

By "close to the wall or touching the wall" is to be understood that the distance of the mixing elements to the inside of the reactor housing and/or to the outside of the cylindrical displacement body, for example 0 or more than 0 to 1%, preferably 0 or more than 0 to 0.5% Regardless of the reactor size, the distance of the mixing elements to the inside of the reactor housing and to the outside of the cylindrical displacement body can be, for example, 0 to 2 mm.

In an embodiment in which the distance of the mixing elements to the inside of the reactor housing and to the outside of the cylindrical displacement body is 0%, i.e. In the contact between the mixing elements and the cooled or heated surfaces, the inside of the reactor housing and the outside of the cylindrical displacement body are completely scraped off, thus ensuring good heat transfer from the reaction medium to the cooling medium via the heat-exchanging surfaces, since the formation of polymer deposits, also called gel deposits, is ensured, can be effectively avoided. Even with the above-mentioned small distances of the mixing element to the inside of the reactor housing and to the outside of the cylindrical displacement body in an alternative embodiment, the good heat transfer remains, since the formation of flow boundary layers on the heat-exchanging surfaces is prevented and deposits due to the strong shear forces are prevented. Furthermore, the helical mixing elements close to the wall or in contact with the wall promote an intensive exchange of the laminar boundary layer on the heat transfer surfaces, which likewise contributes to the intensification of the heat transfer.

The helical mixing elements have, for example, a rectangular or, in a special case, a square cross-section, the one side running parallel to or near the wall to the heat-exchanging surfaces of the reactor housing or the cylindrical displacement body, the surface of the mixing element running at right angles to it being thus perpendicular the heat-exchanging surfaces, so that the axial conveying effect of the mixing element is maximized.

The width of the mixing elements in the radial direction is, for example, between 10% and 100% of the annular gap width, preferably 10% to 50%, particularly, preferably 20%-40%.

The pitch of the helix of the helical mixing elements with respect to the housing wall in the axial direction (slope) can be between $ß=90°$ (vertical mixing elements) and $ß=10°$, preferably $ß=60°-30°$, particularly preferred $ß=50°-40°$. The positions of the individual helices of the helical mixing elements can be different, in particular the positions of the inner and outer helices of the helical mixing elements can differ from one another.

In order to ensure that the helical mixing elements are as close as possible to the wall or in contact with the wall, a support structure between the outer and inner mixing elements is advantageous, which absorbs the mechanical forces that act on the mixing elements during rotation and minimizes mechanical deformation of the mixing elements. For this purpose, 2 or more, preferably 4 or 8 axially arranged tubes, rods or flat profiles are suitable over the entire length of the stirrer, which are firmly connected to the circular disk on the side connected to the drive and firmly connected to the annular disk serving as a radial bearing on the other side, are preferably welded.

During the manufacture of the stirrer, minimal deformation due to the manufacturing process must be observed in order to keep the tolerances so low that the above-mentioned wall distances of the helical mixing elements are maintained over the entire reactor length.

In a preferred embodiment, the entire helical mixing element is not designed close to the wall or in contact with the wall, but in the helical mixing elements there is a groove in the side facing the heat-exchanging surface, into which a sealing tape made of a material is inserted, which is positive Has sliding properties on the heat-exchanging surfaces, so that in the case of wall contact, there is no damage to the surfaces and no excessive forces on the stirrer structure. The material used can be, for example, polytetrafluoroethylene (PTFE), glass fiber reinforced PTFE, polyvinylidene fluoride (PVDF), ethylene-tetrafluoroethylene copolymer (ETFE), polyether-ether-ketone (PEEK), polyoxymethylene (POM), polyethylene (PE) or metallic alloys with non-eating properties such as Act Albromet.

To compensate for finished tolerances in the manufacture of the helical mixing elements and to ensure the required small wall clearance or wall contact over the entire length of the reactor, a spring band is inserted into the groove between the mixing element and the sealing tape. This ensures a certain amount of play, particularly during assembly, which is necessary when the stirrer is inserted into the reactor housing. In addition, it presses the sealing tape against the heat-exchanging surfaces, so that a defined wall contact is guaranteed. The function of the spring band is no longer required during operation, since the sealing band is fixed within the tolerance of the wall after installation. This means that the groove and the spring band can be clogged with polymerization products (gel) and not disruptive to operation.

The helical mixing element or elements can be driven via the drive, and the force transmission can be accomplished by mechanical or magnetic coupling.

When using shafts for mechanical power transmission, these are preferably sealed via a double-acting mechanical seal arranged between the shaft and the reactor housing, the mechanical seal especially containing a barrier medium which is inert under the polymerization conditions. The mechanical seal can enclose an annular chamber space between its two sliding surfaces, which can be filled with the sealing liquid. The barrier fluid, which is particularly pressurized, can lubricate both pairs of slide rings. This prevents educts and/or products from accumulating on the sliding surfaces and causing leaks. In the manufacture of synthetic rubbers, the penetration of water, such as, for example, atmospheric moisture from the ambient air, into the interior of the reactor housing can be avoided. A slowing down of the polymer reaction inside the reactor housing due to water entry and possibly associated catalyst deactivation is thereby avoided. For example, a solvent can be used as the barrier medium, which is also used in the polymerization reaction.

The gel is particularly preferably scraped off at a speed v on the inside of a reactor housing and on the outside of the displacement body of 0.05 m/s≤v≤10 m/s, preferably 0.5 m/s≤v≤6 m/s, particularly preferably 1 m/s≤v≤5 m/s and most preferably 1.5 m/s≤v≤3 m/s. At such speeds and corresponding adjustment of the helical mixing element, a sufficiently large mass transport in the axial direction can be applied, which leads to a good homogeneous mixing of the flow in the axial direction and improves the heat transfer between the flow and the reactor housing. Due to the complex flow form between the helical mixing elements on the reactor housing and on the surface of the cylindrical displacement body, especially when the conveying direction is opposite, effective radial mixing is also achieved.

The cleaning frequency of the heat exchanger surfaces is preferably 0.2-12 $s^{-1}$, preferably 2-10 $s^{-1}$ and particularly preferably 3-7 $s^{-1}$ to effectively prevent the formation of a gel layer. At a defined circumferential speed, this results in the number of helical mixing elements distributed over the circumference.

The reactor housing, the stirrer and the displacement body can be made from all materials known to the person skilled in the art which have and maintain sufficient strength and corrosion resistance under the reaction conditions, such as, for example, commercially available steel. In the case of low temperature applications e.g. At −100° to −30° centigrade, for example, austenitic steel is suitable.

The reactor housing is preferably made of stainless steel 1.4571 or similar steels which are customary and resistant in the chemical industry.

The inside of the reactor housing, which comes into contact with the reaction medium, preferably consists of stainless steel 1.4404 with a reduced Ti content for better polishing properties of the inner surface.

The heat-transferring surfaces are preferably made from suitable steels with particularly high heat conductivities in order to obtain the highest possible heat transfer coefficients between the heating or cooling side and the reaction space.

The heat exchanger preferably has an outer jacket which encloses part of the reactor housing, a spiral-shaped partition wall being preferably arranged between the outer jacket and the reactor housing in order to form a spiral-shaped heat exchanger channel. By means of a constructively simple measure to be implemented, it can be achieved that a heat exchange medium flows in a spiral along the reactor housing and can therefore exchange heat of a corresponding length with the flow within the reactor housing. This enables a particularly large heat flow that can be exchanged between the flow within the reactor housing and the heat exchange medium. Such a configuration of the heat exchanger with a spiral-shaped heat exchanger channel is particularly suitable for single-phase heat exchanger media, for example, if a phase change, for example evaporation and/or condensation, is not carried out when heat is absorbed and/or released. In the case of heat exchange media which carry out a phase change, for example evaporation and/or condensation when heat is taken up and/or given off, the partition wall is in particular omitted, so that the greatest possible turbulence can form within the heat exchanger due to the phase change. At the same time, the inner boundary of the heat exchanger is formed by the reactor housing itself. This avoids an additional heat resistance between the flow inside the reactor housing and the heat exchanger. The heat exchange medium can be conducted, for example, in countercurrent to the flow inside the reactor housing through the spiral heat exchanger channel or in the direction of flow, e.g. if a high cooling capacity at the beginning of the polymerization, i.e. upstream, is required.

For the heating or cooling of the displacement body, the same principles and design features as for the reactor housing can be used.

The ratio of the sum A of the inner surfaces of the tubular reactor housing A1 and the outer surface of the internal displacement body A2 to a volume V of the annular reaction space between the reactor housing and displacement body is particularly preferably 0.1 $m^2/m^3$≤A/V≤100 $m^2/m^3$ preferred 1 $m^2/m^3$≤A/V≤60 $m^2/m^3$, particularly preferred 5 $m^2/m^3$≤A/V≤40 $m^2/m^3$, very particularly preferably 8 $m^2/m^3$≤A/V≤30 $m^2/m^3$.

Because of the helical mixing element close to the wall or in contact with the wall, which prevents the formation of boundary layers on the inside of the reactor housing, it is possible to provide a comparatively slim tubular reactor, the reactor housing of which has a comparatively large internal area in relation to the enclosed volume, in particular since the displacer is also coolable and is also cleaned of helical mixing elements near or touching the wall. Due to the comparatively large inner surface A of the reactor, a correspondingly high heat exchanger capacity can be installed. At the same time, an essentially homogeneous temperature distribution is easier to achieve both in the radial and in the direction. At the same time, the tubular reactor can withstand higher internal pressures without having to select the wall thickness too large. This makes it possible to set and control the reaction parameters even over a larger pressure range.

A ratio L/D of reactor length L to reactor diameter D between 1 and 15, particularly preferably between 2 and 8, very particularly preferably between 3 and 6 is particularly preferred, the length of the reactor interior being understood by reactor length and the diameter of the reactor interior diameter by reactor diameter is.

The ratio D/d of the reactor diameter D and displacement body diameter d is preferably 1.1 to 3.0, particularly preferably 1.2 to 2.0 and very particularly preferably 1.3 to 1.6.

The invention further relates to the use of the tubular reactor described above, which can be designed and further developed as described above, for the production of synthetic rubbers by polymerizing polymerizable monomers within the reactor housing.

In the context of the invention, synthetic rubbers are understood to mean elastomers which do not occur naturally. Preferred synthetic rubbers are butyl rubber, polybutadiene (BR) and polystyrene butadiene (SBR), ethylene propylene diene rubber (EPDM), polyacrylonitrile butadiene rubber (NBR), hydrogenated polyacrylonitrile butadiene Rubber (H-NBR), fluororubbers (FKM), polychloroprene (CR) and polyethylene-vinyl acetate (EVA or EVM) are to be understood, wherein the above-mentioned synthetic rubbers can have, for example, a molar mass of 5,000 to 5,000,000 g/mol.

Particularly preferred synthetic rubbers are butyl rubber and polybutadiene (BR), very particularly preferably butyl rubber with a molecular weight of 300,000 to 1,000,000 g/mol and polybutadiene (BR) with a molecular weight of 5,000 to 1,000,000 g/mol, with butyl rubber with a molecular weight of 300,000 to 1,000,000 g/mol is even more preferred.

Butyl rubber is a copolymer of isobutene (2-methylpropene) and isoprene (2-methylbuta-1,3-diene). The proportion of repeating units in the butyl rubber which are derived from isoprene is, for example, between >0% and 5%, preferably between 1.8 and 2.3 mol %.

The polymerization is typically carried out as a copolymerization of isobutene and isoprene at temperatures from −100° C. to −30° C., preferably −100° C. and −40° C. grade and particularly preferably −100° C. to −60° C. in the presence of a catalyst. For the so-called "slurry process" chloromethane for the so-called "solution process", for example hydrocarbons such as, in particular, open-chain or cyclic, branched or unbranched pentanes, hexanes or heptanes or mixtures thereof can be used as solvents, the aforementioned pentanes and Hexanes or mixtures thereof are preferred.

Depending on the process control, aluminum chloride or aluminum alkyl halides such as, for example, diethyl aluminum chloride, ethyl aluminum dichloride, dimethyl aluminum chloride, methyl aluminum dichloride or mixtures thereof can be used as catalysts. The catalyst or catalysts are activated, for example, with small amounts of protic solvents such as water, hydrochloric acid, hydrogen chloride or aliphatic alcohols such as methanol, and the monomers to be polymerized are suspended or dissolved in the solvent, the solvent in which the polymerization takes place is preferably used as the solvent, Due to the constructive design of the tubular reactor, the reaction conditions inside the tubular reactor can be predicted well, due to the intensive axial and radial mixing, and correspondingly easily influenced and controlled. The average viscosity of the reactor contents is in the range from a few tens to a few hundred mPas, depending on the desired conversion of the monomers. Unless otherwise stated, viscosities are determined by capillary viscometry at a temperature of 23° C. in accordance with ISO 1628 or related thereto.

Due to the intensive mixing, the reaction proceeds evenly in the entire reaction volume, so that the entire heat transfer surface can be used for heat dissipation. Likewise, the viscosity remains low in the entire reaction volume due to the intensive mixing, and e.g. does not increase as the reaction progresses in the case of a plug flow, so that the heat transitions achieved remain constantly high over the entire heat transfer area. The removal of coverings or the renewal of the boundary layer on the heat transfer surfaces by the helical mixing elements near or touching the wall also contributes to this.

The invention is explained in more detail below with reference to the attached drawings on the basis of preferred exemplary embodiments.

It shows:

FIG. 1: a schematic side view of a reactor

FIG. 2: a schematic sectional view of the reactor with liquid cooling

Figure 3:
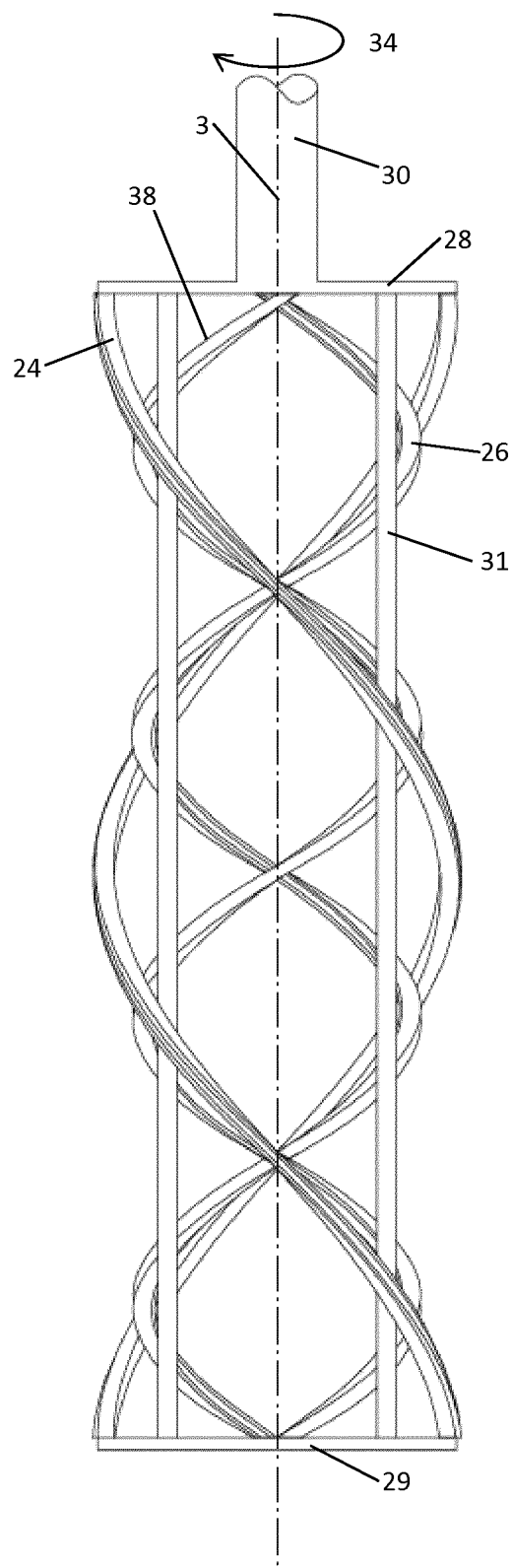
Figure 4:
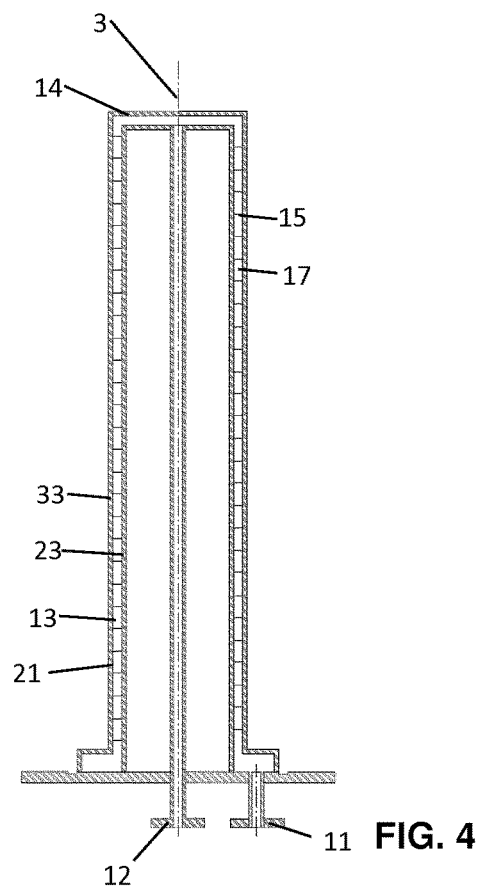
Figure 5:
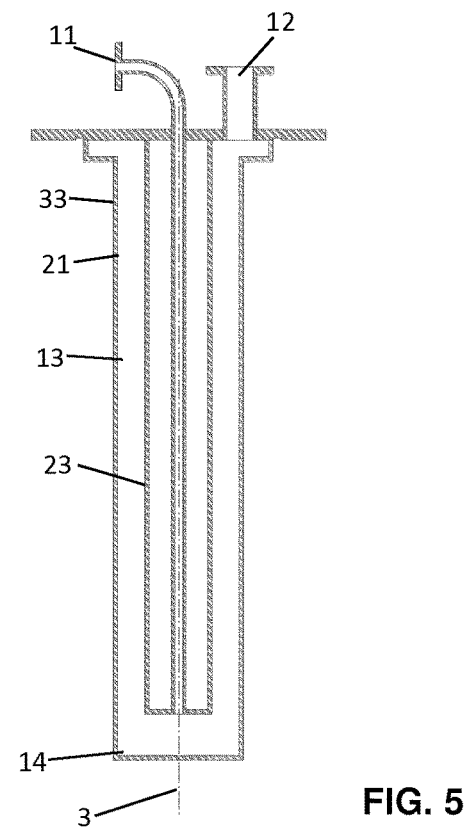
Figure 6:
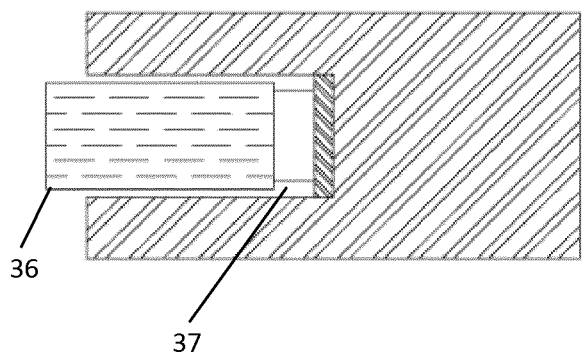
Figure 7:
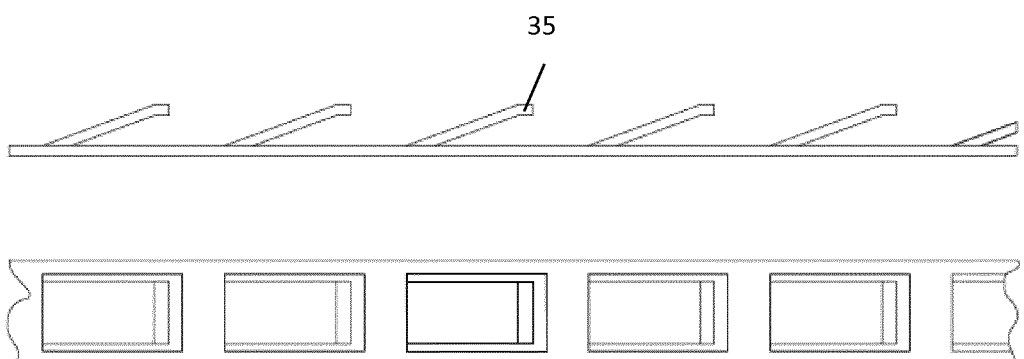

FIG. 3: a schematic side view of the stirrer with two internal mixing elements FIG. 4: a schematic sectional view of the displacement body for liquid cooling FIG. 5: sectional view of the displacement body FIG. 6: a schematic sectional view of a helical mixing element with a spring-mounted sealing tape FIG. 7: a schematic detailed view of the spring band for the resilient mounting of the sealing band FIG. 8: a schematic sectional view of the reactor for evaporative cooling. The reactor 1 shown in FIG. 1 has a geometric central axis 3 which is aligned parallel to a direction of gravity 2, that is to say vertically. The reactor 1 has a tubular reactor housing 4 which is closed on the end face by flanged end plates 5. Educts can be introduced into the tubular reactor housing 4 via at least one inlet 6. The resulting product can leave the reactor 1 via an outlet 7. Due to the stirring effect, there is an almost ideally mixed reaction solution inside the reactor. By continuously feeding the starting materials through the inlet 6, reaction solution is continuously displaced from the reactor housing 4 through outlet 7. The reactor 1 is thus operated continuously in order to carry out a continuous polymerization.

As shown in FIG. 2, the reaction heat generated during the polymerization can be removed via a heat exchanger 10 in the reactor housing 4 and via a heat exchanger 13 in the internal displacement body 14. The heat exchangers are limited on the side facing away from the reaction space by their outer surfaces (22 for heat exchangers 10, 23 for heat exchangers 13). In the case of heating or cooling without phase change in the cooling medium, the heat exchanger 10 in the reactor housing 4 and the heat exchanger 13 in the internal displacement body 14 are provided with spiral-shaped partition walls (16 for heat exchangers 10, 15 for heat exchangers 13 (FIG. 4)) which are provided in the Limit heat exchangers 10 and 13 spiral heat exchanger channels (18 for heat exchangers 10, 17 for heat exchangers 13 (FIG. 4), as a result of which a defined flow of the heat exchange medium from the inlet of the heat exchange medium (8 for heat exchanger 10 in the reactor housing, 11 for heat exchanger body 13 in the heat exchanger 13 Outlet of the heat exchange medium (9 for heat exchanger 10 in the reactor housing, 12 for heat exchanger 13 in the displacement body 14) is achieved. Sufficiently high flows of the heat exchange medium through the heat exchangers 10 and 13 generate a highly turbulent flow with high Reynolds numbers in the spiral heat exchanger channels 18 and 17, whereby a high heat transfer coefficient on the heat exchanger surfaces on the side of the heat exchange medium (20 for heat exchangers 10, 21 for heat exchangers 13) is achieved. Furthermore, in the case of cooling customary in exothermic polymerization reactions due to high cooling medium streams, the heating of the cooling media along the heat exchanger channels is limited, so that a uniform temperature control of the reaction space 19 is made possible. In principle, it is possible to arrange several heat exchangers in series, both in the reactor housing and in the displacement body, each of which has separate inlets and outlets, so that the heating of the cooling medium can be further reduced and the uniform temperature control of the reaction space is further improved.

In the reaction chamber 19, a stirrer is contained, in the exemplary embodiment consisting of 2 helical mixing elements 24 which are arranged close to the wall or in contact with the reactor housing 4 and 2 helical mixing elements 26 which are arranged near the wall or in contact with the outside of the displacement body 14. The number of inner and outer helices is determined by the cleaning frequency of the heat exchanger surfaces on the product side 32 and 33. With increasing reactor diameter and constant peripheral speed of the stirring elements on the reactor housing, the number of mixing elements increases in order to obtain an approximately constant cleaning frequency of 3-7 $s^{-1}$.

The helical mixing elements 24 and 26 are connected to the drive shaft 30 via a circular disk 28. At the end of the stirrer facing away from the drive shaft, the helical mixing elements 24 and 26 are connected to an annular disk 29 which has a tight play with the reactor housing 4 and/or the displacement body 14, and thus ensures additional centering of the stirrer. A support structure consisting of 2 or more support profiles 31 is used to stabilize the stirrer, which are firmly connected (welded) to the helices 24 and 26 at the contact points. Furthermore, the support profiles 31 are firmly connected (welded) to the circular disk 28 and the annular disk 29. The support profiles can consist of rods or tubes or of flat profiles.

The heat exchanger surfaces on the product side (32 for heat exchangers 10, 33 for heat exchanger 13) are cleaned by the mixing elements near or touching the wall, so that no insoluble polymer components (gel) adhere and the heat transfer coefficient on the product side is not impaired, Furthermore, the boundary layer on the heat exchanger surfaces is constantly renewed as a result, so that the heat flow from the interior of the reaction space to the heat exchanger surfaces is intensified.

In the exemplary embodiment, the outer helices 24 are oriented downwards in the direction of rotation, and the inner helices 26 are upwards. As a result, a loop flow is imposed on the product flow direction from the inlet 6 to the outlet 7, so that within the reaction space 19 there is an approximately ideal mixing and an approximately homogeneous temperature distribution, which leads to a narrow and defined molecular weight distribution in the polymerization reaction.

In production, it is very complex and costly to manufacture a helical mixing element with such accuracy that the required minimum wall distances or even wall contact are ensured at all points of the reactor. Therefore, the helical mixing element is manufactured with a larger wall distance and the wall near or wall contact is ensured via a spring-loaded sealing tape within a groove running over the entire helical mixing element.

FIG. 6 shows a cross section through a helical mixing element 24 and 26 with a sealing tape 36 which is resiliently mounted via a spring tape 35. The spring band 35 is inserted into the groove. The sealing tape is fitted into the groove of the helical mixing element with play. The sealing strips 36 of the outer helical mixing elements 24 are slightly above the insertion of the stirrer into the reaction space 19 on the reactor housing 4, the sealing strips 36 of the inner helical mixing elements 26 are slightly above the insertion of the stirrer into the reaction space 19 on the displacement body 14. When the stirrer is inserted, the sealing tapes are pressed into the groove against the spring force of the spring band, so that after the stirrer is inserted, they are pressed against the reactor housing or the displacer body by the spring band. In this way, a position of the sealing tapes in contact with the wall is achieved; in the event of manufacturing tolerances, the sealing tape is at least very close to the wall within the tolerances mentioned above, so that adequate wall cleaning and boundary layer renewal is ensured.

During operation, the groove can become clogged with insoluble polymer components (gel) or other solids, but the sealing tape remains in its position between the spring band and the reactor housing or between the spring band and displacement body with a sufficiently small wall clearance, only the function of the spring band is impaired. however, this is no longer required after the stirrer has been introduced in the company.

FIG. 7 shows an embodiment of the spring band 35. The spring force can be influenced and easily adjusted here by the type of material, the material thickness and the display of the spring arms.

FIG. 5 shows an embodiment of the displacement body 14 for a boiling cooling system with an evaporating cooling medium, such as e.g. Ethylene, propane or ammonia. Compared to the version for heat exchange media without phase change, the spiral partition in the heat exchanger of the displacement body is eliminated. In order to reduce the pressure losses in the cooling medium, a larger discharge nozzle for the 2-phase outlet mixture is recommended. 8 shows a schematic sectional view of a reactor with boiling cooling. It is advisable to arrange the drive shaft 30 at the lower end of the reactor and to arrange inlets 11 and outlets 12 for the heat exchange medium in the displacement body at the upper end of the reactor in order to ensure that the 2-phase cooling medium can escape from the coolant chamber.

A list of reference numerals is given below:
1. Reactor
2. Direction of Gravity
3. Geometric Central Axis
4. Tubular Reactor Housing
5. End Plates
6. Inlets
7. Outlets
8. Inlets heat exchange medium for heat exchangers in the reactor housing (10)
9. Outlets heat exchange medium for heat exchangers in the reactor housing (10)
10. Heat exchangers in the reactor housing
11. Inlets heat exchanger medium for heat exchanger in the displacement body (13)
12. Outlets heat exchange medium for heat exchangers in the displacement body (13)
13. Heat exchangers in the displacement body
14. Displacement bodies
15. Spiral partition for heat exchangers in the displacement body (13)
16. Spiral partition for heat exchanger in the reactor housing (10)
17. Spiral heat exchanger channel in the heat exchanger in the displacement body (13)

18. Spiral heat exchanger channel in the heat exchanger in the reactor housing (13)
19. Reaction space
20. Heat exchanger surface on the side of the heat exchange medium for heat exchanger in the reactor housing (10)
21. Heat exchanger surface on the side of the heat exchange medium for heat exchanger in the displacement body (13)
22. Outer jacket of the heat exchanger in the reactor housing (10)
23. Outer jacket of the heat exchanger in the displacement body (13)
24. Outer helical mixing element, close to the wall or in contact with the wall reactor housing 4
26. Inner helical mixing element, close to the wall or touching the wall of the displacement body 14
28. Circular disk
29. Washer
30. Drive shaft
31. Support profiles
32. Heat exchanger surface on the product page for heat exchangers in reactor housing (10)
33. Heat exchanger surface on the product page for heat exchangers in displacement body (13)
34. Direction of rotation
35. Spring band
36. Sealing tape
37. Groove
38. Stirring

EXAMPLE

In a test reactor with a reactor length L of 320 mm and a reactor diameter D 100 mm (L/D=3.2) with a central displacement body with a displacement body diameter d of 70 mm (d/D=0.7) and one Stirrer with 4 helical mixing elements over the entire reactor length, whereby 2 of the helical mixing elements close to the wall on the outer surface of the reactor housing and 2 of the helical mixing elements close to the wall on the surface of the internal displacement body (distance approx. 1 mm each), a starting solution was prepared 33.5% by weight solvent (alkane), monomers metered in continuously 1.5% by weight isoprene and 65% by weight isobutene. The starting material stream was dimensioned so that there was an average residence time of 15 minutes in the reactor. The reactor was completely filled with liquid.

To activate the polymerization reaction, a solution of the initiator (ethylaluminium dichloride, EADC) was additionally metered in in such an amount that the proportion of polymer in the total solution at the reactor outlet was between 10 and 15% by weight. The initiator was dissolved in the same solvent as the monomers.

The polymerization takes place under cryogenic conditions, i.e. the reactant solution and the solution containing the initiator were cooled to an inlet temperature of −80 to −60° C. before entering the reactor, and the reactor was also kept at a constant reaction temperature of −65° C. via a liquid cooling on the jacket side. A cooling of the internal displacement body was not necessary on this scale due to the high surface area to volume ratio of the housing wall to the reaction space.

The peripheral speed of the outer helical mixing elements was approximately 0.5 m/s.

Under the aforementioned conditions, butyl rubber (copolymer of isobutene and isoprene) was reproducibly obtained with a narrow molar mass distribution with a molar mass of 420-480 kg/mol and a polydispersity of 2.3 to 2.6.

The running times of the reactor were in the range of 5-10 days without a reduction in the heat transfer properties before removal of the insoluble polymer portion was necessary, in particular from the outgoing lines and parts of the stirrer, which led to an increase in pressure in the reactor and to a reduction in the reaction space ie lead to a reduction in the dwell time.

What is claimed is:

1. A reactor for the continuous production of synthetic rubbers, comprising at least one essentially tubular reactor housing, an internal displacement body arranged essentially along a geometric axis of the reactor and extending essentially a length of the reactor, a reaction space between the housing and the internal displacement body, the reactor housing having a drive shaft connected to an outer stirrer and an inner stirrer which are rotatably arranged inside the reactor housing, the outer stirrer containing at least one helical mixing element, which is close to or in contact with a wall of the reactor housing, and the inner stirrer containing at least one helical mixing element which is close to or in contact with a wall of the internal displacement body; wherein the helical mixing element of the inner stirrer has a conveying direction opposite to a conveying direction of the helical mixing element of the outer stirrer.

2. The reactor according to claim 1, characterized in that the reactor has a geometric center axis arranged essentially horizontally or essentially vertically.

3. The reactor according to claim 1, characterized in that the internal displacement body is designed in such a way that a temperature control medium can flow through it.

4. The reactor according to claim 1, characterized in that the helical mixing elements are designed such that the distance of the helical mixing elements to the reactor housing and the helical mixing elements to the internal displacement body 0 or more than 0 to 1% based on the radial diameter of the reactor housing.

5. The reactor according to one claim 1, characterized in that the reactor housing is connected to a conveying device for conveying starting materials into the reactor housing and/or for conveying products from the reactor housing.

6. The reactor according to claim 1, characterized in that the drive shaft is sealed via a double-acting mechanical seal arranged between the drive shaft and the reactor housing.

7. The reactor according to claim 1, characterized in that the helical mixing elements of the stirrer are made continuously over the entire reactor length from one part or from several parts which are connected to one another in a form-fitting manner, so that results in a continuous helix over the entire reactor length.

8. The reactor according to claim 1, wherein the one or more helical mixing elements of the outer stirrer includes more than one helical mixing elements which are arranged at a uniform distance from one another in the direction of rotation.

9. The reactor according to claim 1, characterized in that a width of the helical mixing elements perpendicular to the surface of the reactor housing 10% to 100% of the annular gap width between the reactor housing and displacement body.

10. The reactor according to claim 1, characterized in that the placement of the helical mixing elements in relation to the surface of the reactor housing in the axial direction (slope) from ß=10° to ß<90°.

11. The reactor according to claim 1, characterized in that the at least one helical mixing element designed close to the wall or in contact with the reactor housing has a gradient and the at least one helical mixing element designed close to the wall or in contact with the wall of the internal displacement body has a different gradient.

12. The reactor according to claim 1, characterized in that a speed of the drive shaft is selected such that the peripheral speed of the helical mixing elements on the surface of the reactor housing is between 0.05 m/s to 10 m/s.

13. The reactor according to claim 1, characterized in that a ratio of the reactor length L to reactor diameter D (L/D) is 1 to 15.

14. The reactor of claim 1, wherein the reactor includes a first heat exchanger for controlling a temperature of a first surface of the housing in contact with the reactor space and a second heat exchanger for controlling a temperature of a second surface of the internal displacement body in contact with the reactor space, wherein a ratio of a volume of the reactor space to the total surface area of the first and second surfaces is from 1 $m^2/m^3$ to 60 $m^2/m^3$.

15. A reactor for the continuous production of synthetic rubbers, comprising at least one essentially tubular reactor housing, the reactor housing having a drive shaft connected to at least one stirrer which is rotatably arranged inside the reactor housing, the stirrer containing at least one helical mixing element, which are close to or in contact with a wall of the reactor housing;
wherein the reactor has a heat exchanger, the heat exchanger in turn having an outer jacket surrounding part of the reactor housing, and the heat exchanger includes a spiral partition between the outer jacket and the reactor arranged to form a spiral heat exchanger channel.

16. The reactor according to claim 15, wherein the reactor includes an internal displacement body and a heat exchanger having an outer casing, the heat exchanger surrounding part of the internal displacement body, wherein the heat exchanger includes a spiral partition between the outer casing and the displacement body forming a spiral heat exchanger channel.

17. The reactor according to claim 16, characterized in that the heat exchanger is suitable for temperature control with phase change.

18. The reactor according to claim 15, characterized in that the heat exchanger is suitable for temperature control with phase change.

19. The reactor according to claim 15, characterized in that the stirrer has at least one helical mixing element designed close to the wall or in contact with the reactor housing, and at least one helical mixing element designed close to the wall or in contact with a wall of the internal displacement body.

20. A reactor for the continuous production of synthetic rubbers, comprising at least one essentially tubular reactor housing, an internal displacement body arranged essentially along a geometric axis of the reactor, the reactor housing having a drive shaft connected to an outer stirrer and an inner stirrer which are rotatably arranged inside the reactor housing, the outer stirrer containing at least one helical mixing element, which is close to or in contact with a wall of the reactor housing, and the inner stirrer containing at least one helical mixing element which is close to or in contact with a wall of the internal displacement body;
wherein the reactor includes a support structure between the helical mixing elements of the inner stirrer and the helical mixing elements of the outer stirrer, wherein the support structure includes 2 or more support profiles running parallel to the geometric central axis.

21. The reactor according to claim 20, characterized in that the support profiles have a rectangular cross-section and, compared to the radial direction, an adjustment γ of γ=0° to 90°.

22. The reactor according to claim 20, characterized in that the support profiles have a round cross-section and rectangular profiles are attached to these support profiles, which have an angle γ of γ=0° to 90°.

23. The reactor according to claim 20, characterized in that a ratio D/d of a diameter, D, of the reactor housing and a diameter, d, of the internal displacement is 1.1 to 3.0.

24. The reactor according to claim 20, characterized in that at least one of the helical mixing elements contains a groove into which a sealing tape is inserted.

25. The reactor according to claim 24, characterized in that the sealing tape is pressed via a spring mechanism onto the surfaces of the reactor housing or the internal displacement body, so that the sealing tape is close to the wall or in contact with the wall during operation of the reactor to the surfaces of the reactor housing or the internal displacement body.

26. The reactor according to claim 24, characterized in that the sealing tape is made of polytetrafluoroethylene (PTFE), glass fiber reinforced PTFE, polyvinylidene fluoride (PVDF), ethylene tetrafluoroethylene copolymer (ETFE), polyether-ether ketone (PEEK), polyoxymethylene (POM), polyethylene (PE) or a metallic alloy with non-eating properties compared to steel.

27. A method for the continuous production of polymers by polymerization of polymerizable monomers, characterized in that the polymerization is carried out in a reactor according to claim 1.

28. The method according to claim 27, wherein the reactor includes an internal displacement body arranged essentially along a geometric central axis of the reactor, characterized in that in the reactor has a circulating flow or loop flow of starting materials and during the polymerization, a product is impressed on a surface of a heat exchanger on the reactor housing and on a surface of a heat exchanger on the internal displacement body, wherein the solids or gels that have deposited on the surfaces of the heat exchangers are removed mechanically.

29. The method according to claim 28, characterized in that the mechanical removal is carried out by scraping or wiping.

* * * * *